REISSUED MAY 17 1870
C. Shea. Compensating Spring.
3982 Fig 1.
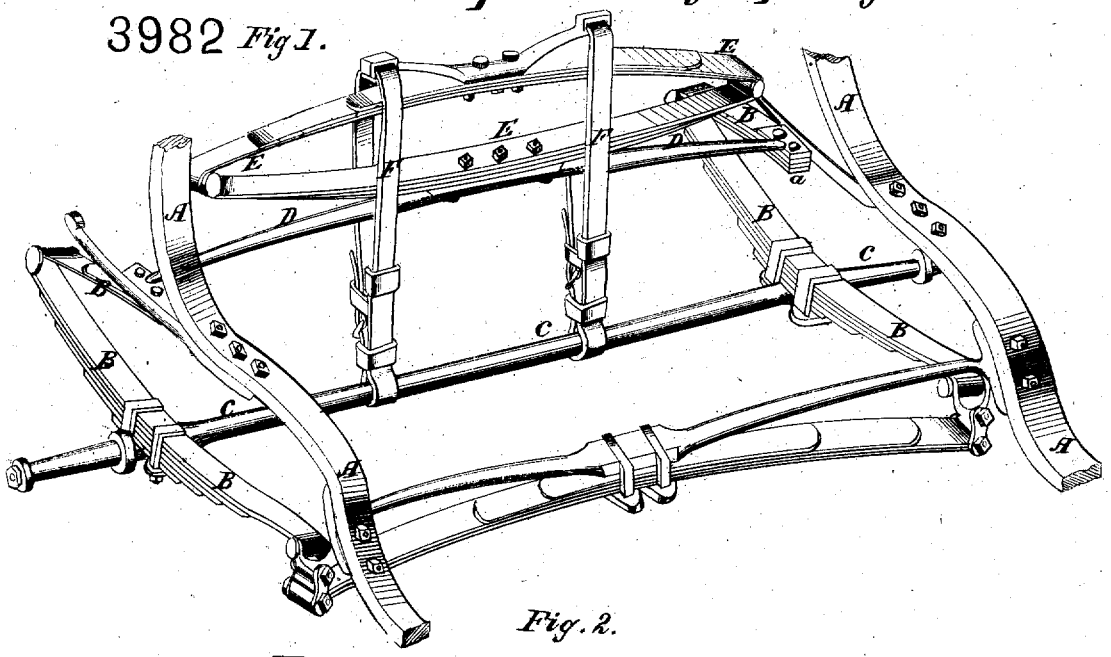
Fig. 2.
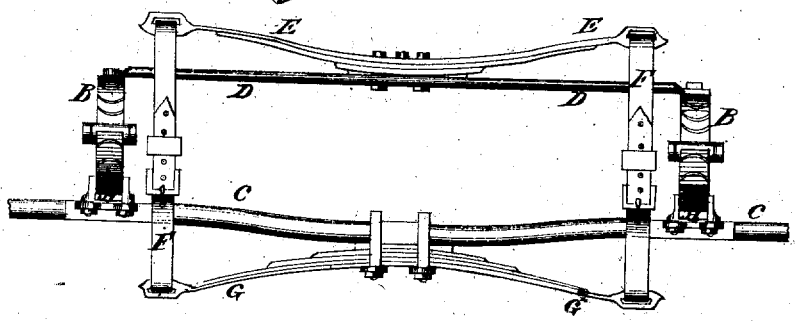
Fig. 3.
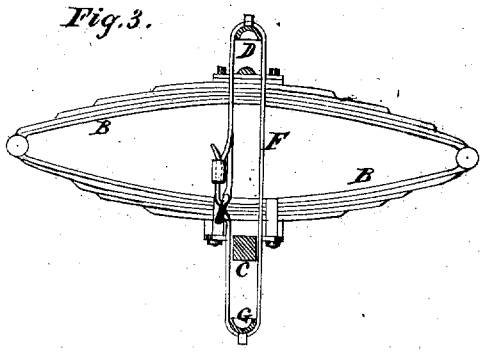
Witnesses:
Alex F. Roberts
Geo. N. Mabee
Inventor:
C. Shea
PER Wm. C. Dodge
Attorneys.

United States Patent Office.

CHARLES SHEA, OF NEWARK, NEW JERSEY.

*Letters Patent No.* 95,736, *dated October* 12, 1869; *reissue No.* 3,982, *dated May* 17, 1870.

DIVISION A.

IMPROVED EQUILIBRIUM SPRING.

The Schedule referred to in these Letters Patent and making part of the same.

*To all whom it may concern:*

Be it known that I, CHARLES SHEA, of Newark, in the county of Essex and State of New Jersey, have invented a new and improved Compensating Carriage-Spring; and I do hereby declare that the following is a full, clear, and exact description thereof, which will enable others skilled in the art to make and use the same, reference being had to the accompanying drawings forming part of this specification, in which—

Figure 1 represents a perspective view of my improved compensating carriage-spring.

Figure 2 is a side view of a modification of the same.

Figure 3 is an end view of said modification.

Similar letters of reference indicate corresponding parts.

The object of this invention is to provide means for avoiding the jar and inconvenience of sudden motion of carriages and other wheeled vehicles.

The invention consists in providing compensating springs in connection with the ordinary carriage-springs, the said compensating springs being so arranged as to act in opposite directions to the main springs. When the pressure is on the main or bearing spring it is off the compensating spring, and when on the latter it is off the former.

It is well known that carriages and wagons, when loaded, are not as liable to break their springs as they are when not loaded, because, in the latter case, the great shock produced when one of the wheels drops into a depression, will cause a rebound of the carriage-body, injurious to the spring and carriage, and inconvenient to its occupant.

By my invention all these defects are entirely overcome, as the additional counteracting springs keep all the main springs so balanced that they cannot become overstrained when the weight on them is suddenly thrown off with a tendency of stretching them in the wrong direction.

A in the drawing are the sills or side pieces of a carriage or wagon-body resting upon the springs B, which are secured to the axle C in the ordinary manner.

The upper arms or parts C of the springs B are connected with each other by a rod, D, upon which a compensating spring, E, is placed, said spring being by means of suitable straps F, connected with the axle.

When the springs B are compressed by a load, the spring E is expanded, and without any effect, but when, by a shock, the springs B are expanded with violence, they are relieved by the spring E, which is compressed to arrest the outward action of the springs B. Thereby, not only the springs B, but also the carriage-body and its appendages, are protected from injury, and the person of the rider from discomfort.

Fig. 1 shows my invention applied to springs with jointed arms.

In figs. 2 and 3 it is shown on elliptical springs.

In this latter case another compensating spring, G, may be applied in connection with the spring E, it being secured to the under side of the axle, as shown.

The straps F connect the ends of the springs E G, so that, when the springs B are compressed, the said straps will be slackened, and no effect is made on the springs E G; but when the bearing springs are violently expanded, the straps will be stretched, and will strain the springs E G, to relieve the bearing springs B. Wagons and carriages may, if desired, receive other kinds of springs for bearing and counteracting purposes, and I do not confine myself to the precise details herein set forth. Rubber, metal, or other suitable material may be used for the compensating springs in various suitable forms.

Having thus described my invention,

I claim as new and desire to secure by Letters Patent—

The springs B, having arms *a*, the rod D, and compensating spring E, all combined, constructed, and relatively arranged, as and for the purpose described.

CHARLES SHEA.

Witnesses:
GEO. W. MABEE,
ALEX. F. ROBERTS.